Sept. 17, 1935. J. T. SIMMONS Re. 19,711

APPARATUS AND METHOD FOR REMOVING FLUIDS FROM WELLS

Original Filed May 10, 1932

Inventor
John T. Simmons
By
Hardway Matthews
Attorneys

Reissued Sept. 17, 1935

Re. 19,711

UNITED STATES PATENT OFFICE 19,711

APPARATUS AND METHOD FOR REMOVING FLUIDS FROM WELLS

John T. Simmons, Longview, Tex., assignor to Simmons Automatic Valve Company, Longview, Tex., a corporation of Texas Original No. 1,927,958, dated September 26, 1933, Serial No. 610,365, May 10, 1932. Application for reissue October 31, 1933, Serial No. 696,090

13 Claims. (Cl. 103—233)

This invention relates to apparatus and method for removing fluids from wells.

An object of the invention is to provide apparatus for lifting fluids, such as oil, from deep wells by the use of low pressure gas, air or other similar lifting fluid.

Another object is to provide apparatus whereby the fluid to be lifted may be elevated in stages from above downwardly.

Another object is to provide an apparatus of the character described equipped with valves of a novel type arranged to maintain the pressure line closed against the entrance of fluid from the well while the apparatus is being lowered but which will successively open from above downwardly when the pressure fluid is applied through said pressure line.

Another object is to provide an apparatus of the character described which can be used in wells having tubing of different sizes, and with or without standing valve, or back pressure valve in the tubing beneath the pressure line.

A further object is to provide an apparatus of the character described which is of such construction that the lifting fluid, whether gas or air, will at all times be effective to lift the well fluid from the well for the reason that the valve through which said lifting fluid is being discharged from the pressure line is always beneath the level of the fluid to be lifted, in the well.

A still further object is to provide a pressure line for the lifting fluid with a novel type of discharge valves so arranged and spaced apart from above downwardly that the well fluid will not be subjected to great pressure which would result in the oil accumulating in the well being driven back into the oil sand; but by means of which the oil, or other well fluid, may be lifted and discharged from the well a head at a time from above downwardly so that a lifting fluid under comparatively low pressure can be utilized, thus making it possible to use inexpensive equipment for supplying the pressure or lifting fluid and lessening the liability of bursting the pressure line.

A further object is to provide in an apparatus for removing liquid from a well, a novel type of control valve.

With the above and other objects in view this invention has particular relation to certain novel features of construction, operation and arrangement of parts an example of which is given in this specification and illustrated in the accompanying drawing, wherein.

Figure 1:
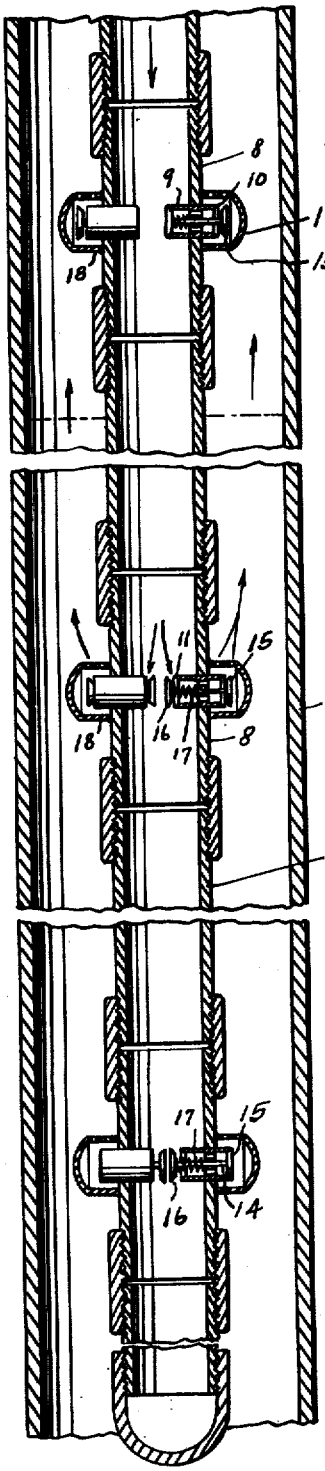
Figure 1 shows a vertical sectional view showing the lower end of the apparatus in a tubing in a well.
Figure 2:
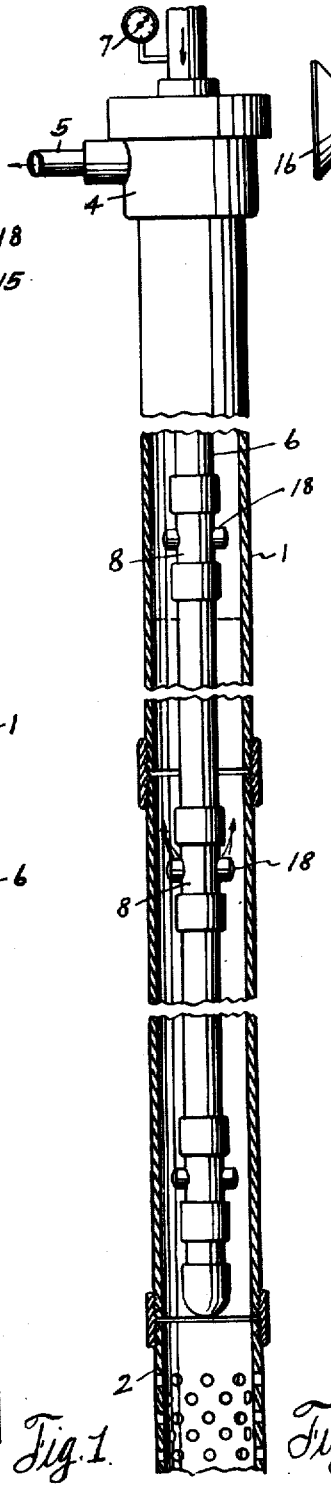
Figure 2 shows a side view of the complete apparatus in a well, the well tubing and screen being shown partly in section.
Figure 4:
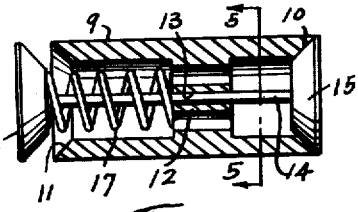
Figure 4 shows a longitudinal, sectional view of a valve mechanism employed.
Figure 5:
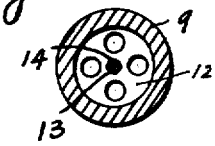
Figure 5 shows a cross sectional view taken on the line 5—5 of Figure 4.
Figure 3:
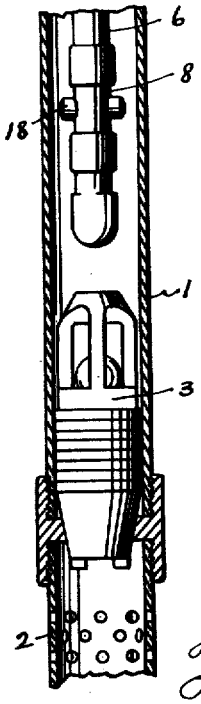
Figure 3 shows a fragmentary side elevation of the lower end of the apparatus as located in a well tubing which is equipped with a standing valve and is shown in section.

Referring now more particularly to the drawing wherein like numerals of reference designated similar parts in each of the figures, the numeral 1 designates the well tubing which may have a screen 2 at its lower end and, if desired, the tubing 1 may have a standing valve 3 above the screen.

Attached to the upper end of the tubing there is a tubing head 4 which may have the outflow line, or discharge line, 5, leading outwardly therefrom.

A pressure line 6, for the lifting fluid may be located so as to extend down into the tubing to the required depth with its lower end usually above the screen 2 and above the back pressure valve 3 if the latter is used.

This pressure line has a fluid tight fit through the casing head 4 and may be equipped with the pressure gauge 7 if desired.

The pressure line 6 may have any desired number of short sections, or tubular inserts, as 8 incorporated therein, and spaced approximately a uniform distance apart and each insert 8 has one or more valve mechanisms therein which will now be described. Each valve mechanism includes a valve tube 9 through the wall of the insert 8 and whose outer and inner ends are flared forming the valve seats 10 and 11. Each tube 9 has an internal spider 12 having a bearing 13 through which the valve stem 14 may slide axially with respect to the corresponding tube 9. Each stem 14 has an outer valve 15 and an inner valve 16 fixed thereto whose inner sides are beveled to conform to the shape of and to fit against the corresponding valve seats 10 and 11. Surrounding each stem 14 and interposed between the corresponding spider 12 and inner valve 16 there is a strong coil spring 17, the springs of the valves of the lower insert 8 being stronger than those of the valves above.

The lower end of the pressure line 6 is closed and surrounding the outer ends of the valve tubes 9, and secured to the corresponding inserts, or sections 8, are the hoods 18 whose upper sides are perforated to permit the outlet of the pressure, or lifting, fluid and to properly distribute the same.

The apparatus may be assembled as shown and as the pressure line 6 is let down into the well the valves 15 will be closed by the springs 17 and will remain closed until the lifting fluid is applied, under pressure, through the line 6. The oil or other fluid in the well will thus be excluded from the line 6 while it is being lowered. When the pressure line is lowered to the required depth all of the valves will be submerged beneath the level of the oil in the well. Pressure fluid, such as gas or air may now be introduced into the line 6 and it will cause the upper valves 15 to open first for the reason that these valves are subjected to the least pressure from the oil in the well, being located nearer the oil level than the other valves beneath. The lifting fluid will then pass out through the upper tubes 9 and will lift the oil above out through the tubing 1 and discharge line 5. As this oil is lifted from the well the oil level in the well will be lowered beneath said upper valves 15 and the outside pressure against said upper valves 15 will thus be decreased and the continued pressure of the lifting fluid within the line 6 will now operate to close the upper valves 15 which will be held closed by the pressure of the lifting fluid in line 6. The next succeeding valves 15 will now be opened by the pressure of the lifting fluid in line 6 by reason of the fact that the outside pressure of the well fluid against said valves has been decreased. The lifting fluid will now escape through the corresponding tubes 9 and the oil will again be discharged from the well lowering the level of said oil in the well and gradually decreasing the outside pressure against said open valves 15 until said pressure and the pressure of the corresponding springs 17 are overcome and the corresponding valves 16 will now close said tubes 9. The pressure of the operating fluid in the line 6 will now operate to open the lower valves 15 and to hold the valves 16 above closed. The lifting, or operating, fluid passing through the line 6 will now operate to lift the next succeeding head of oil, as before and discharge it from the well, and when the outside pressure decreases sufficiently the pressure of the fluid in the line 6 will close the lower valves 16. The spring 17 tending to open the lower valves 16 are made stronger than those of the other valves above and when the lower valves 16 are closed the level of the oil in the well will begin to rise and submerge the lower valves and the outside pressure, assisted by the corresponding springs 17, will tend to open said lower valves 16 and the pressure in the line 6 may be decreased sufficiently to permit said lower valves 16 to open and the operating fluid will now escape through said opened valves and discharge another head of oil. Thereafter the lower valves will alternately open and close, as above stated, to discharge the oil from the well in successive heads.

From the foregoing it is obvious that high pressure lifting fluid will not be required for the reason that the well fluid is started to flow in stages, or heads, and after the operation is started only a predetermined head is permitted to accumulate before it is elevated and discharged from the well.

It is obvious that in shallow wells only the lower valve may be necessary through which the operating fluid may be introduced successively into the liquid to be lifted as said liquid accumulates and the liquid thus discharged from the well successively by heads.

The drawing and description disclose what is now considered to be a preferred form of the invention by way of illustration only, while the broad principle of the invention will be defined by the appended claims.

What I claim is:

1. Apparatus for removing fluid from wells comprising a pressure line adapted to be lowered into a well and having passageways spaced apart along the line and radially movable double acting valves for controlling said passageways and normally held closed to prevent the inlet of the fluid from the well.

2. Apparatus for removing fluid from wells comprising a pressure line adapted to be lowered into a well and having its lower end closed, said line having outlet passageways spaced apart longitudinally therealong, radially movable double acting outlet valve means positioned to control the passageway, and arranged to be successively opened and then closed by the pressure of an operating fluid in the line.

3. Apparatus for removing fluid from wells comprising a pressure line adapted to be lowered into a well and having its lower end closed and having outlet passageways spaced apart longitudinally therealong, each passageway having an outer and an inner seat, valve means subject to the pressure of the well fluid and controlling said passageways, means assisted by said pressure and normally holding the valve means in position to maintain the passageway through the outer seat closed against the entrance of fluid from the well into said line, said valve means being subject to the pressure of an operating fluid in said line and being formed to permit the passageway through the outer seat to be opened and the passageway through the inner seat to be then closed by said pressure.

4. Apparatus for removing fluid from wells comprising a pressure line adapted to be lowered into a well and having outlets spaced apart longitudinally along said line, and closed beneath the lower outlet, valve means for controlling each outlet, each valve means including an outer valve arranged to be closed by pressure outside of the line and an inner valve rigidly connected to the outer valve arranged to be closed by the pressure of an operating fluid in the line.

5. Apparatus for removing fluid from wells comprising a pressure line adapted to be lowered into a well and having outlets spaced apart longitudinally along said line, and having its lower end closed, valve means for controlling each outlet, each valve means including an outer valve arranged to be held closed by pressure outside of the line, to exclude the entrance of the well fluid into said line, and an inner valve connected to the outer valve and arranged to be closed by the pressure of an operating fluid in the line, resilient means normally tending to hold the outer valve closed and the inner valve open.

6. Apparatus for removing fluid from wells comprising a pressure line adapted to be lowered into a well, tubes through the wall of said line spaced apart longitudinally along the line, each tube having an outer and an inner valve seat, an outwardly opening valve arranged to control said outer seat, an inwardly opening valve arranged to control said inner seat, means connecting said outer and inner valves which prevents their independent movement and means closing the line beneath the lowermost tube.

7. Apparatus for removing fluid from wells comprising a pressure line adapted to be lowered into a well, tubes through the wall of said line spaced apart longitudinally along the line, each tube having an outer and an inner valve seat, an outwardly opening valve arranged to control said outer seat, and whose maximum area is exposed to the pressure of the wall fluid, an inwardly opening valve arranged to control said inner seat, means connecting said outer and inner valves which prevents their independent movement, and yieldable means normally holding the inner valve open and the outer valve closed.

8. Apparatus for removing fluid from wells comprising a pressure line adapted to be lowered into a well, tubes through the wall of said line spaced apart longitudinally along the lines, each tube having an outer and an inner valve seat, an outwardly opening valve arranged to control said outer seat, an inwardly opening valve arranged to control said inner seat, means connecting said outer and inner valves which prevents their independent movement, a spring within each tube normally holding the inner valve open and the outer valve closed, and a perforated hood forming a shield around and spaced from the outer end of each tube.

9. Apparatus for removing fluid from wells comprising a tubular pressure line having elongated, radial passageways adjacent the lower end of the line and spaced apart longitudinally along said line, an outwardly opening and an inwardly opening valve associated with each passageway, means connecting said valves to prevent their independent movement, yieldable means normally tending to hold the outwardly opening valve in position to close said passageway and the inwardly opening valve in position to open said passageway, said valves being exposed to the pressure of an operating fluid in said line whereby their positions may be reversed, the resistance of the lower yieldable means exceeding that of those above.

10. Apparatus for removing fluid from wells comprising a pressure line having openings spaced apart longitudinally along the line, a bearing in each opening, means closing the line beneath the lower opening, valve means controlling such openings, each valve means having a stem working through the corresponding bearing and being formed to be subjected to the pressure of an operating fluid in said line whereby said openings may be opened and then closed successively from above downwardly by the operating fluid moving in a constant direction.

11. The method of removing a fluid from a well having a tube and pressure line which consists in introducing a confined column of an operating fluid through said line, under pressure, into the well and initially introducing said operating fluid from said column into the well fluid in successive stages from above downwardly and finally introducing said operating fluid, intermittently, into the well fluid at the lowermost stage only whereby said well fluid will be discharged from the well.

12. The method of removing a fluid from a well which consists in introducing a confined column of an operating fluid through a pressure line, under pressure, into a well, initially releasing said operating fluid from said column, into the well fluid, successively at different levels from above downwardly, whereby the well fluid will be discharged by heads between the line and the walls of the well and finally introducing said operating fluid, intermittently, into the well fluid at a lower level and excluding the operating fluid from the well fluid at higher levels.

13. Apparatus for removing liquid from a well comprising a tubular line adapted to be lowered into a well to provide two conduits one within the line, and the other between said line and the walls of the well, one of said conduits being provided to conduct an operating fluid into the well, and the other conduit being provided for the discharge of liquid from the well, said line having passageways spaced apart longitudinally along said line, and the line being closed beneath the lower passageway, valve means for controlling each passageway, each valve means including a valve arranged to be closed by the pressure of the liquid being elevated, and also including a valve rigidly connected to the first-mentioned valve and arranged to be closed by the pressure of the operating fluid.

JOHN T. SIMMONS.